United States Patent [19]
Lin et al.

[11] Patent Number: 5,256,869
[45] Date of Patent: Oct. 26, 1993

[54] FREE-SPACE OPTICAL INTERCONNECTION USING DEFORMABLE MIRROR DEVICE

[75] Inventors: Tsen-Hwang Lin; Gregory A. Magel, both of Dallas, Tex.

[73] Assignee: Texas Instruments Incorporated, Dallas, Tex.

[21] Appl. No.: 907,758

[22] Filed: Jun. 30, 1992

[51] Int. Cl.⁵ .................................. G01J 1/20
[52] U.S. Cl. .................. 250/201.9; 359/318; 356/121; 250/551
[58] Field of Search ............... 250/201.9, 551, 227.11; 385/17; 359/224, 849, 847, 117, 318, 320; 356/121

[56] References Cited

U.S. PATENT DOCUMENTS

| | | | |
|---|---|---|---|
| 3,514,183 | 5/1970 | Rabedeau | 359/224 |
| 4,271,355 | 6/1981 | Wisner et al. | 250/201.9 |
| 4,393,303 | 7/1983 | Spinhirne | 250/201.9 |
| 4,589,740 | 5/1986 | Durremberger | 359/224 |
| 4,725,144 | 2/1988 | Nelson et al. | 359/849 |
| 4,859,012 | 8/1989 | Cohn | 359/849 |
| 4,875,764 | 10/1989 | Marino et al. | 359/224 |
| 4,875,765 | 10/1989 | Vandenberg et al. | 359/224 |
| 4,923,302 | 5/1990 | Ealey et al. | 356/376 |
| 5,128,660 | 7/1992 | DeMond et al. | 340/709 |
| 5,142,132 | 8/1992 | MacDonald et al. | 250/201.9 |

FOREIGN PATENT DOCUMENTS

| | | | |
|---|---|---|---|
| 0035322 | 2/1987 | Japan | 359/224 |
| 0035323 | 2/1987 | Japan | 359/224 |

OTHER PUBLICATIONS

"4×4 free-space optical switching using real-time binary phase-only holograms generated by a liquid-crystal display", Hirofumi Yamazaki and Massayasu Yamaguchi, Optics Letters, Sep. 15, 1991, vol. 16, No. 18, pp. 1415-1417.

Primary Examiner—David C. Nelms
Assistant Examiner—Michael Messinger
Attorney, Agent, or Firm—Dana L. Burton; Richard A. Stoltz; James C. Kesterson

[57] ABSTRACT

A method and apparatus for performing free space optical interconnection. A micro-mirror type of spatial light modulator has an array of mirror elements, whose height with respect to a deflection plane can be individually adjusted. These heights are adjusted such that an input beam of light is phase modulated, and by interference, it is deflected to a desired detector. More than one input beam can be used with the same spatial light modulator, whose mirror elements are adjusted in patterns for deflecting and focussing to multiple detectors.

19 Claims, 2 Drawing Sheets

5,256,869

FREE-SPACE OPTICAL INTERCONNECTION USING DEFORMABLE MIRROR DEVICE

TECHNICAL FIELD OF THE INVENTION

This invention relates to optical interconnections, and more particularly to a free-space optical interconnection that uses a deformable mirror device to redirect and focus light to a desired detector.

BACKGROUND OF THE INVENTION

A recent improvement in the field of data communications and data processing has been the use of optical interconnections. As compared to electronic interconnections, optical interconnections have much broader bandwidth. An example of a system using optical interconnections is a computer, having a processor that communicates with various memory and other related computing devices via optical devices. Another example, is a computer having multiple processing elements that communicate with each other by means of an optical switch.

Optical interconnections can be divided into two categories: guided wave and free-space. Guided wave interconnections use optical fibers or integrated optical devices. However, they have the disadvantage of providing only fixed interconnections and are cumbersome when large numbers of inputs and outputs are involved. In contrast, free-space switches use the non-interactive property of photons to provide high density non-blocking interconnects.

Free-space optical interconnections are especially suitable for parallel processing applications because of the availability of more input-output ports. An example of an application for a free space interconnect is a parallel processing system, which uses arrays of optical devices to provide connections among processing elements. Light from each input is deflected by the optical device and received by the desired output.

One implementation of such a deflection type free space interconnect uses a fixed array of holographic patterns to deflect input beams. A problem with fixed holographic methods is that the hologram cannot be changed in real time.

Another type of deflection type free space interconnect uses holograms to deflect spatially separated input beams. Programmable holograms can be provided using spatial light modulators. In general, spatial light modulators are two-dimensional planar devices, which permit a light beam or electrical signal to control the transmission or reflection of light at each point on its surface. Certain types of spatial light modulators can be used to control the phase of light at each point.

One example of using a spatial light modulator for a free space interconnection is using a liquid crystal display as the spatial light modulator. The display's pixel elements are adjusted to change the phase of transmitted light. This phase change affects the direction of the output beam. A computer may be used to control individual pixel elements, which permits real time reconfiguration of holographic switching patterns. A problem with this method is that the relatively large size of the pixel elements and the spacing between them is detrimental to efficiency. Also, the pixel elements are essentially binary in the sense that the phase of the pixel elements is difficult to control other than in either of two states.

An interconnect system that uses both a fixed hologram and a spatial light modulator is described in U.S. patent Ser. No. 5,170,269, entitled "Programmable Optical Interconnect System". A first location on the fixed hologram is used to reflect a source beam to a detector, as well as to a deformable mirror device (DMD). The DMD redirects the light to a second location on the hologram, which then redirects a second beam to the detector. The hologram and DMD determine whether this second beam is in phase or out of phase with the first beam at that detector. The resulting constructive or destructive interference determines whether that detector will receive light. Thus, a distinctive characteristic of this system is the use of both a DMD and a hologram, which each provide a beam at a detector.

A need exists for a free space switch that is simple and inexpensive. It should avoid the need for a fixed hologram and permit real time programmability of an interconnection pattern. The switch should also permit a large number of interconnects.

SUMMARY OF THE INVENTION

One aspect of the invention is a free space optical interconnect, that uses at least one deformable mirror spatial light modulator, located on a deflection plane, for deflecting and focussing light to a receiving plane. Each spatial light modulator has an array of mirror elements having a reflective surface that is movable toward and away from the deflection plane. The mirror elements of each spatial light modulator are individually addressable with an applied voltage such that each reflective surface is attracted toward the deflection plane while said voltage is applied. A light source provides an input beam, which illuminates the reflective surfaces of the mirror elements. At least one light intensity detector for receiving deflected and focussed output light is located on a receiving plane, which is spaced apart from the deflection plane. The position of individual mirror elements determines the phase of the deflected light at any point of the deflection plane, and thus their combined effect as a DMD array determines whether any one detector will receive light.

A technical advantage of the invention is that its DMD has high resolution, as compared to other types of spatial light modulators. The higher resolution permits light to be used more efficiently and also permits more interconnects in a given space. The programmability of the DMDs permits an interconnect pattern to be reconfigured in real time. These features permit real time changes between massively parallel processing algorithms, having differently interconnected processing elements.

DETAILED DESCRIPTION OF THE INVENTION

An underlying premise of the invention is that certain types of deformable mirror devices (DMDs) can be used to implement holographic principles for application in a free space optical interconnect. More specifically, a DMD is a type of spatial light modulator. It has an array of micromechanical mirror elements, each of whose position can be adjusted to affect the path length of the light it reflects. The path length is related to the phase of deflected light. This relationship can be used with the array of mirror elements to control the angle at which light of a given intensity travels toward one or more detectors. In a DMD array, individually addressable mirror elements can be adjusted and spaced in patterns to provide one or more output beams, each to a desired detector.

Figure 1:
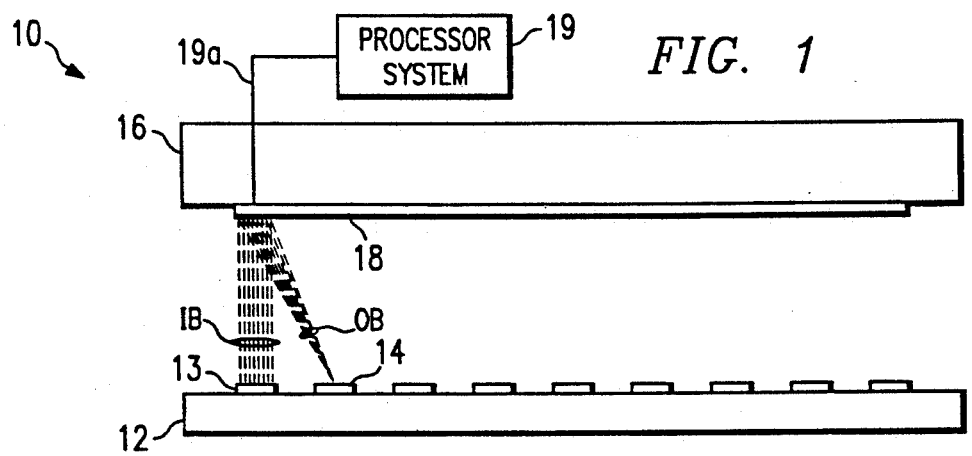
FIG. 1 illustrates an optical interconnect in accordance with the invention, as well as how a single input beam is redirected to a single output detector.

FIG. 1 illustrates a basic free-space optical interconnect 10 that uses DMDs. A light receiving plane 12 has at least one light source 13 and at least one detector 14. Detectors 14 are any type of photo detector, and are typically intensity sensitive point detectors.

A deflection plane 16 has at least one phase modulating DMD 18. An amplitude modulating DMD 18 could be used but at the cost of lower optical efficiency. In FIG. 1, and in the following description, a single DMD 18 having different portions available for differently programmed deflection patterns is used. However, instead of portions of a single DMD 18, with multiple patterns, multiple DMD's each having a different pattern could be used. Each DMD 18 is programmable by means of an electronic address bus 19a, which carries voltage signals from processor system 19. Input means (not shown) for addressing and changing the state of individual mirror elements are known in the art of spatial light modulators. As explained below, processor system 19 is used to calculate patterns of applied voltages to result in position patterns of the mirror elements.

The input beam (IB) and output beam (OB) illustrate a connection between a single input at source 13 and a single output at a detector 14. Thus, FIG. 1 illustrates a one-to-one connection. However, as explained below in connection with FIGS. 5–7, interconnect 10 can be used with a single source 13 and multiple detectors 14 for one-to-many interconnections. Also, more than one source 13 could be used to simultaneously provide input to one or more DMDs 18, which then deflect to one or more detectors 14.

Figure 1A:
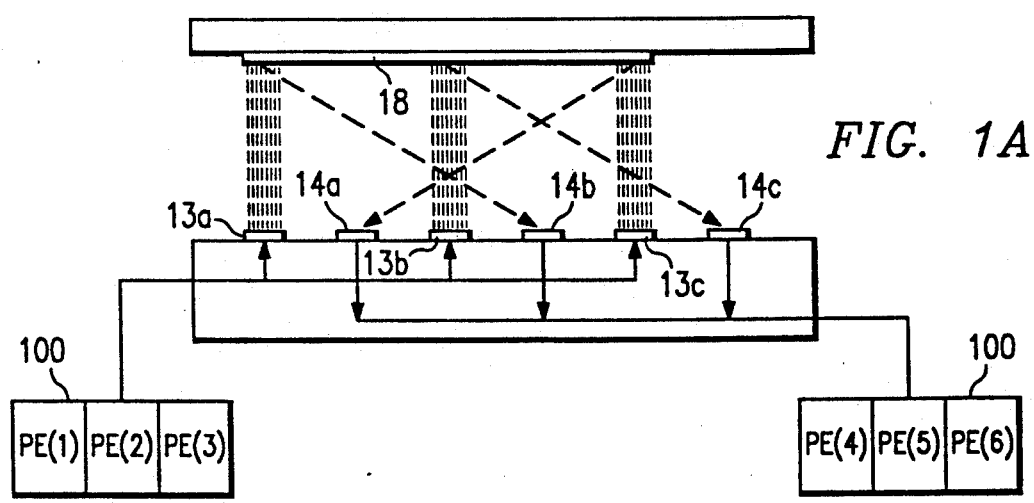
FIG. 1A illustrates use of the switch of FIG. 1 for parallel processing.

FIG. 1A illustrates the use of interconnect 10 for a typical parallel processing application. Each of a number of sources 13 are in communication with at least a source processing element 100, for example PE(1)-PE(3), of a parallel processing system. Each detector 14 is in communication with a destination processing element 100, for example PE(4)-PE(6). Interconnect 10 permits any source processing element 100 to deliver data, in the form of modulated light signals, to any destination processing element 100. Also, as explained below, DMDs 18 can be configured so that light from any one source 13 can be deflected to more than one detector 14.

Source 13 is preferably a coherent source, such as a laser, which delivers a beam of light to DMD 18. By modulating the input beam, source 13 conveys data in the form of on or off pulses of light. Other types of sources 13 could also be used, such as a constant amplitude laser that illuminates an amplitude modulator. Typically, source 13 is an amplitude modulating source, because of the fact that detectors 14 will generally be intensity sensitive rather than phase sensitive.

Figure 2:
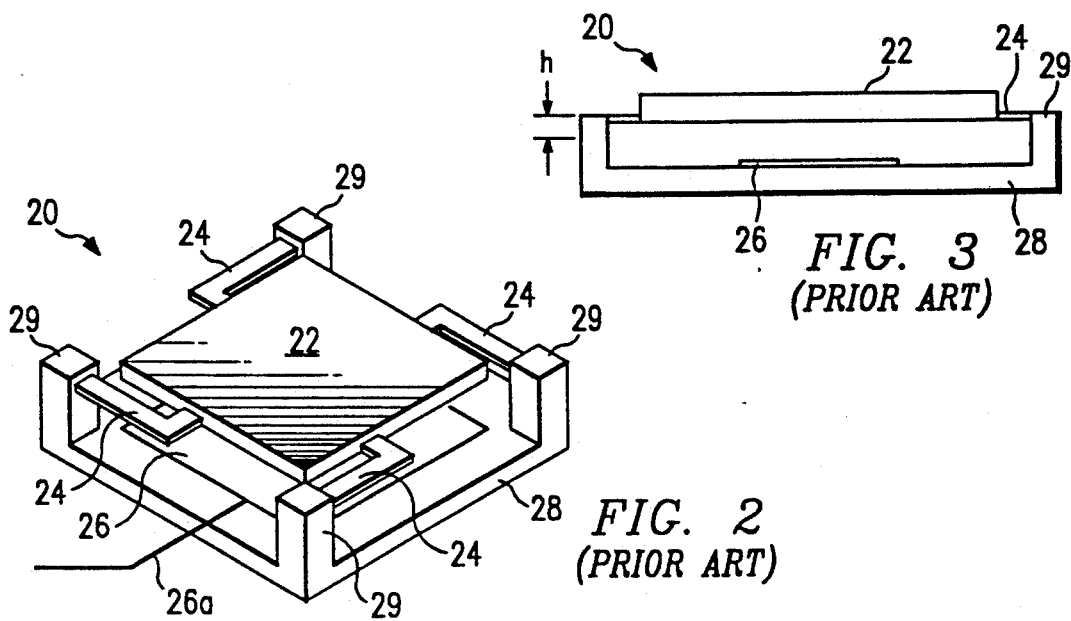
FIG. 2 illustrates a flexure beam DMD, suitable for use in the unit of FIG. 1.

FIG. 2 illustrates an example of a mirror element 20 of a phase modulating DMD 18, suitable for use in the interconnect 10. At each mirror element 20, the position of a mirror 22 determines the phase of light reflected from its surface back to detectors 14 on light receiving plane 12. A predetermined pattern of applied voltages to the mirror elements 20 of a DMD 18 determines which detector 14 or detectors 14 will receive light having a detectable intensity, i.e., which detector 14 or detectors 14 will receive an output beam. The operation of DMDs 18 is further explained in connection with FIGS. 4–7.

The example of FIG. 2 is a flexure beam mirror element 20. A rigid mirror 22, which can be any reflective flat surface, is supported by four hinges 24. Due to the square arrangement of hinges 24 at right angles to each other, mirror 22 is capable of substantially up and down motion. For providing the motion, an electrode 26 is located under each mirror 22, spaced away from the mirror 22. Each electrode 26 is individually addressable with an applied voltage via an electrical input line 26a. When a pre-determined voltage is applied to electrode 26, mirror 22 is electrostatically attracted to it. Hinges 24 permit mirror 22 to move downward toward electrode 26, for a distance that can be determined by the amount of applied voltage. When the applied voltage is removed, hinges 24 provide a restoring force to reset mirrors 22 to a zero phase change state.

DMD 18 may be fabricated using integrated circuit techniques. For ease of fabrication, mirror 22 may be built over a spacer layer 28. The spacer material may be etched away to leave four support posts 28 with a gap between electrode 26 and mirror 22.

Figure 3:
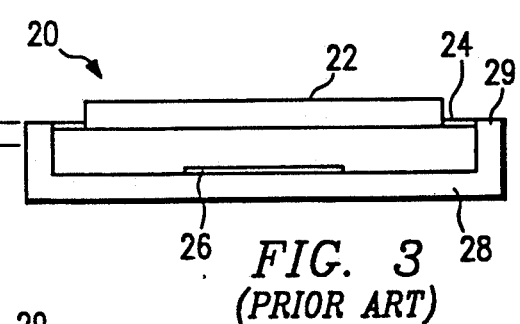
FIG. 3 is a side view of a mirror element of a DMD.

FIG. 3 is a side view of a DMD mirror element 20. A characteristic of each mirror element 20 is that it is capable of a continuous range of motion over a range of values of h, between its maximum excursion position and its zero phase change position. An advantage of this characteristic is that it permits the phase of deflected light to be adjusted to any desired value, assuming that $h_{max}$ is greater than $\frac{1}{2}$ the wavelength of the incoming light.

When all mirror elements 20 are in their zero phase change state, the surface of DMD 18 is planar and all light that illuminates DMD 18 will be reflected from DMD 18 in a manner that approximates a simple plane mirror. However, in a predetermined pattern of adjusted positions, i.e., different values of h, the mirror elements 20 of DMD 18 will reflect light in different phases resulting in interference, which may or may not result in detectable light at any detector 14. As explained below, the position of each mirror element 20 is related to a desired phase, which can be calculated using known algorithms executed by a processor.

Figure 4:
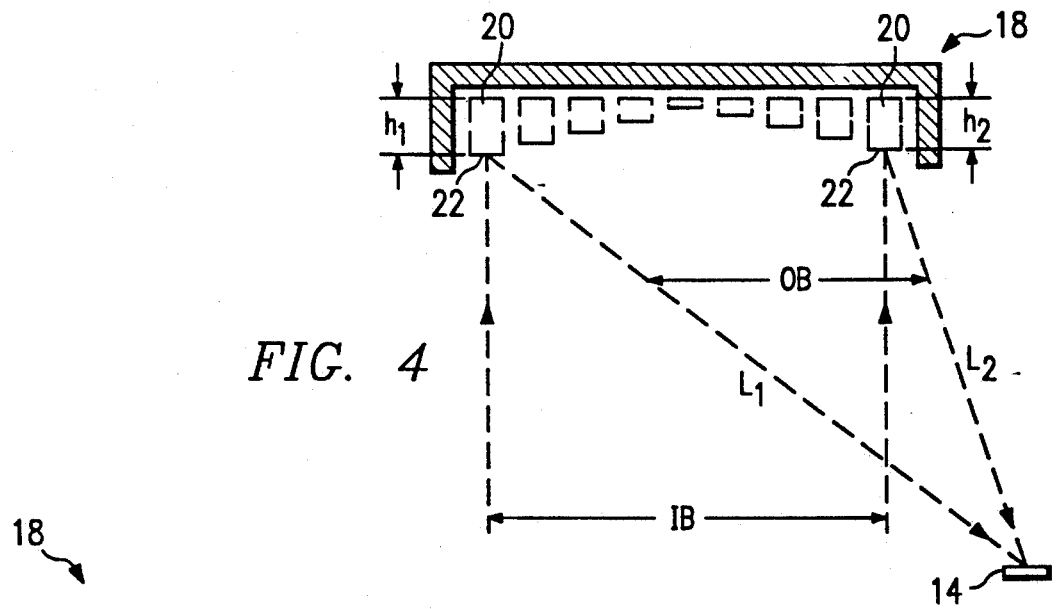
FIG. 4 illustrates the positioning of the mirror element of a DMD to deflect an input beam to a single detector.

FIG. 4 illustrates how all, or some portion, of the mirror elements 20 of a DMD 18 can be positioned to deflect an incoming beam to a desired detector. A beam of incoming light, IB, is incident on all mirror elements 20. For purposes of example, it is assumed that IB is a plane wave incident normal to the mirror surfaces of DMD 18. Each mirror 22 is set at a predetermined distance, h, from its electrode 26. In the example of FIG. 4, the mirrors 22 of outer mirror elements 20 are set at a greater distance from their electrodes 26, i.e., smaller values of h, than are the mirrors 22 of the inner mirror elements 20. Other mirror elements 20 are positioned at intermediate values of h. To achieve direction as well as focussing, mirror elements 20 closer to detector 14 are set at smaller values of h. Thus, in the example of FIG. 4, the deflection surface resulting from adjusted mirror elements 20 of DMD 18 simulates a curved mirror for deflecting and focussing a beam to a detector 14. In actuality, the finite deflection range of each mirror element 20 will require setting its phase modulo-$2\pi$.

The path length of the beam, L, of the output beam, OB, deflected from a mirror element 20 is determined by its distance, h, from its electrode 26. This in turn, determines the phase of the light received at a detector 14. For an incoming light beam having a wavelength, $\lambda$, the relationship between a beam's change in phase and a change in path length is expressed as:

$$\Delta\phi = 2\pi/\lambda \cdot \Delta L,$$

where $\Delta\phi$ is the phase change and $\Delta L$ is the change in path length. Thus, a deflected beam whose output path length is different from that of another output beam by a known value $\Delta L$, will have a known phase change of $\Delta\phi$. Because mirror elements 20 are reflective, $\Delta L$ is equal 2 times $\Delta h$.

When the positions of mirror elements 20 are varied with respect to each other, the phase differences between the light reflected from them determine the constructive or destructive interference of the reflected light, and hence the intensity of the total light at any one detector 14 in light receiving plane 12. Thus, depending on the position of each mirror element 20, an input beam may be both directed to and focussed on a desired detector 18.

For mirror elements 20 that are all similarly positioned, the relationship between the phase of an incoming beam and the angle of diffraction from the DMD 18, which represents a reflective diffraction grating, may be expressed as $$\sin\theta\, d = m\lambda,$$

where $\theta$ is the angle of diffraction, d is the spacing between mirror elements 20, and m represents the order of diffraction.

The above equation for angle of deflection illustrates that the distance, d, between mirror elements 20 has an effect on the angle of deflection. Light can be re-distributed between orders of diffraction by altering the phase of individual mirror elements. Although FIG. 4 has the discernible shape of a curved mirror, other positioning and spacing of mirror elements 20 can be determined to result in deflection surfaces that are not as obvious. In general, the mirror elements 20 of a DMD 18 can be programmed into different holographic deflection surfaces, with varying values of h and d. Like a hologram, DMD 18 can direct and focus output beams to desired locations on an output plane. The input to each mirror element 20 of a DMD 18 can be computer controlled in real time, resulting in a real time programmable hologram.

Figure 5:
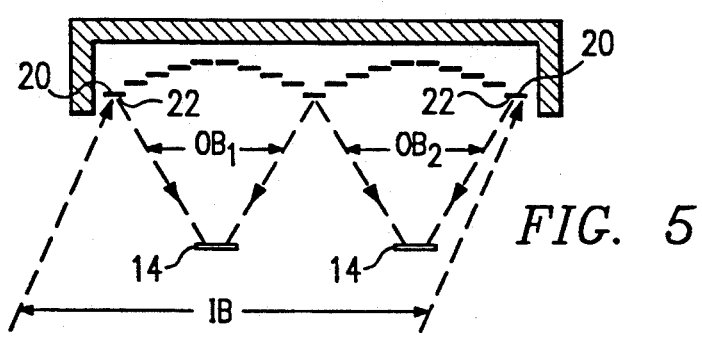
FIGS. 5 and 6 illustrate how the mirror elements can be positioned to deflect an input beam to more than one detector.
Figure 6:
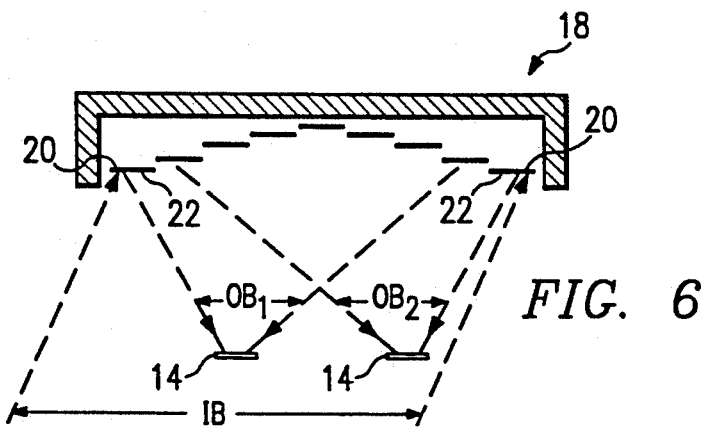

FIGS. 5 and 6 illustrate how a single DMD array 18 may be used to deflect an incoming beam to two or more detectors 14. In FIG. 5, the DMD array 18 has been partitioned into a left half and a right half. Each half simulates a curved mirror, as does the DMD of FIG. 4, by varying h. Each partition receives part of the incoming light, but each redirects and focusses its part of the input light to a different detector 14. In FIG. 6, the mirror elements 20 associated with one of two different detectors 14 are interleaved. The incoming light is split into two outgoing beams, each directed to a detector 14.

The principles illustrated in FIGS. 5 and 6 can be used to interconnect any number of detectors 14 with an input beam, with the primary limitation being the resolution of the DMD array 18, i.e., the number of mirror elements 20. Sufficiently intense light must be focussed on each detector 14 to be detectable. The intensity of the light at a detector 14 is in part determined by the number of mirror elements 20 used for that detector 14.

Figure 7:
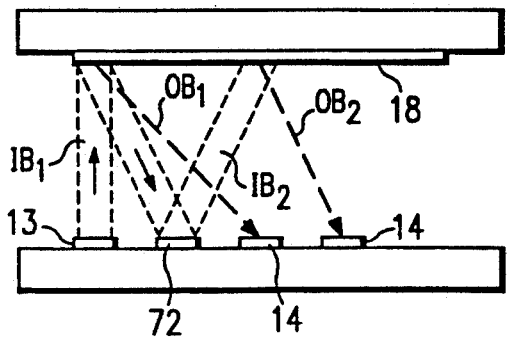
FIG. 7 illustrates how the interconnect of FIG. 1 can be modified to use a single source to provide more than one input beam.

FIG. 7 illustrates a second method by which source 13 provides input to more than one detector 14. U.S. Pat. No. 5,170,269 which is incorporated herein by reference, describes a method of "bouncing" an input beam. The same basic technique could be applied to the present invention. Thus, an input beam $IB_1$ from source 13 is received by a first DMD 18, which redirects a focussed output beam $OB_1$ to a first detector 14 as well as a collimated beam to fixed mirror 72. This collimated beam is bounced to a second DMD 18 which provides a deflected and focused output beam $OB_2$ to a second detector 14.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A free space optical interconnect, comprising:
   at least one spatial light modulator located on a deflection plane for deflecting and focussing light to a receiving plane, wherein each spatial light modulator has an array of mirror elements each having a reflective surface that is movable;
   means for addressing each of said reflective mirror elements with an applied voltage such that each mirror element may be attracted toward said deflection plane while said voltage is applied;
   at least one coherent light source for illuminating said reflective surfaces of said mirror elements; and
   one or more detectors located on said receiving plane, wherein each of said mirror elements is positionable such that the phase of a deflected light beam from said mirror element is programmable, thereby determining which of said detectors receive said light beam.

2. The interconnect of claim 1, and further comprising a processor for calculating the amount of voltage to be applied to each of said mirrors, and for providing communication of said voltage to said mirror elements.

3. The interconnect of claim 1, wherein said reflective surfaces are supported by means of one or more flexible hinges that provide a restoring force after said applied voltage is removed.

4. The interconnect of claim 1, wherein said spatial light modulator is fabricated as an integrated circuit.

5. The interconnect of claim 1, and further comprising at least one mirror for receiving collimated light reflected from a first portion of said spatial light modulator and for reflecting said collimated light to a second portion of said spatial light modulator.

6. The interconnect of claim 1, and further comprising a number of coherent light sources, each providing light for illuminating a different portion of said spatial light modulator.

7. A method of using a micro-mirror spatial light modulator to provide free space optical interconnection, comprising the steps of:

using a processor for calculating a pattern of phase changes of light deflected from a point on a deflection surface that will result in deflecting and focussing light to a detector in a known location, in an intensity detectable by said detector;

individually addressing mirror elements of a micro-mirror spatial light phase modulator with an applied voltage, such that the mirror of each of said mirror elements moves with respect to a deflection plane, a predetermined distance to provide said pattern of phase changes;

illuminating said spatial light modulator with an input beam of coherent light; and using said spatial light modulator for deflecting said input light to said detector.

8. The method of claim 7, and further comprising the step of calculating more than one pattern of phase changes, such that said spatial light modulator may be used for deflecting light to more than one detector.

9. The method of claim 8, wherein said patterns of phase changes are interleaved among said mirror elements.

10. The method of claim 8, wherein said patterns of phase changes are associated with mirror elements of a portion of said spatial light modulator.

11. The method of claim 8, wherein said patterns of phase changes result in a focussing surface of said spatial light modulator.

12. The method of claim 7, and further comprising the step of calculating distances between mirror elements that will contribute to deflecting and focussing light to said detector.

13. The method of claim 7, and further comprising the step of using a mirror to reflect said input beam to more than one of said spatial light modulator and of using each of said spatial light modulators to deflect light to a desired detector.

14. The method of claim 7, and further comprising the step of using a mirror to reflect said input beam to different portions of said spatial light modulator.

15. The method of claim 7, and further comprising the step of repeating said calculating, addressing, illuminating, and deflecting steps for more than one spatial light modulator and more than one detector.

16. A method of providing interconnections between processing elements of a parallel processing computer, comprising the steps of:

associating each of a number of input processing elements with at least one light source;

modulating said light source to provide on and off amplitudes of an input light beam in accordance with data from the associated input processing elements;

illuminating a micro-mirror spatial light modulator on a deflection plane with said light source;

adjusting the mirror height of at least a portion of an array of mirror elements of said spatial light modulator such that each input light beam will be deflected to a desired light detector on a receiving plane;

receiving the deflected light at said light detector; and using an output processing element associated with each light detector to interpret electrical output from said detector.

17. The method of claim 16, wherein said adjusting step comprises adjusting sets of mirror elements, each set associated with a different detector, to deflect light to more than one detector.

18. The method of claim 16, and further comprising the step of adjusting spacing between at least a portion of said mirror elements, such that light is deflected to and focused at said desired light detector.

19. The method of claim 16, wherein said steps are repeated for multiple spatial light modulators, each deflecting light to a desired detector.

* * * * *